(12) United States Patent
Wu

(10) Patent No.: US 9,490,945 B2
(45) Date of Patent: *Nov. 8, 2016

(54) METHOD OF ESTABLISHING MULTIPLE LINKS WITH MULTIPLE COMPONENT CARRIERS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/617,953

(22) Filed: Feb. 10, 2015

(65) Prior Publication Data

US 2015/0156809 A1   Jun. 4, 2015

Related U.S. Application Data

(63) Continuation of application No. 12/541,982, filed on Aug. 17, 2009, now Pat. No. 8,989,105.

(60) Provisional application No. 61/160,713, filed on Mar. 17, 2009.

(51) Int. Cl.
*H04W 36/00* (2009.01)
*H04W 76/02* (2009.01)
(Continued)

(52) U.S. Cl.
CPC .......... *H04L 5/001* (2013.01); *H04W 36/0066* (2013.01); *H04W 36/08* (2013.01);
(Continued)

(58) Field of Classification Search
CPC ............ H04L 5/001; H04W 36/0066; H04W 56/001; H04W 56/00; H04W 56/0005; H04W 72/042; H04W 72/0453; H04W 74/0833; H04W 76/025
See application file for complete search history.

(56) References Cited

U.S. PATENT DOCUMENTS 8,934,417 B2   1/2015   Nory
8,989,105 B2   3/2015   Wu
(Continued)

FOREIGN PATENT DOCUMENTS

EP   1 331 832 A2   7/2003
EP   1331832 A2    7/2003
(Continued)

OTHER PUBLICATIONS

Alcatel-Lucent Shanghai Bell, Alcatel-Lucent, C-RNTI allocation in CA scenario, TSG-RAN WG2#68bis R2-100397, Jan. 18-22, 2009, pp. 1-4, Valencia, Spain.

(Continued)

*Primary Examiner* — Ahmed Elallam
(74) *Attorney, Agent, or Firm* — Winston Hsu; Scott Margo

(57) ABSTRACT

A method of establishing multiple links with multiple component carriers comprises establishing a first link corresponding to a first component carrier by performing an RRC procedure, to a mobile device, wherein the type of the first RRC procedure is an RRC connection establishment procedure, a handover procedure, or an inter-RAT handover procedure; and establishing at least a link corresponding to at least a component carrier other than the first component carrier by performing a second RRC procedure which is initiated by transmitting a first RRC message to the mobile device via the first link, to the mobile device, wherein the type of the second RRC procedure is an RRC connection reconfiguration procedure or a handover procedure, and the first link established by the first RRC procedure and the at least a link established by the second RRC procedure are configured with the same C-RNTI for PDCCH receptions.

18 Claims, 4 Drawing Sheets

(51) Int. Cl.
H04W 76/04 (2009.01)
H04W 36/08 (2009.01)
H04W 72/04 (2009.01)
H04W 56/00 (2009.01)
H04W 74/08 (2009.01)
H04L 5/00 (2006.01)

(52) U.S. Cl.
CPC ........ H04W56/001 (2013.01); H04W 72/042 (2013.01); H04W 72/0453 (2013.01); H04W 74/0833 (2013.01); H04W 76/025 (2013.01); H04W 76/046 (2013.01)

(56) References Cited

U.S. PATENT DOCUMENTS

| | | |
|---|---|---|
| 2008/0039094 A1 | 2/2008 | Jeong |
| 2008/0299996 A1 | 12/2008 | Tseng |
| 2010/0015967 A1 | 1/2010 | Perets |
| 2010/0130137 A1 | 5/2010 | Pelletier |
| 2010/0222059 A1 | 9/2010 | Pani |
| 2010/0232382 A1 | 9/2010 | Gauvreau |
| 2010/0303039 A1 | 12/2010 | Zhang |
| 2013/0077585 A1 | 3/2013 | Pan |

FOREIGN PATENT DOCUMENTS

| | | |
|---|---|---|
| EP | 1331832 A3 | 10/2005 |
| JP | 2005328525 A | 11/2005 |
| JP | 2006510260 A | 3/2006 |
| WO | 2004054135 A1 | 6/2004 |
| WO | 2007077096 A2 | 7/2007 |
| WO | 2007077096 A3 | 7/2007 |
| WO | 2010082521 A1 | 7/2010 |

OTHER PUBLICATIONS

Notice of allowance mailed on Dec. 8, 2015 for the Japanese Application No. 2013-160114, filing date Aug. 1, 2013, pp. 1-3.
Office Action mailed on Jul. 7, 2015 for the U.S. Appl. No. 14/645,417, filed Mar. 11, 2015, p. 1-15.
European Search report issued on Sep. 9, 2015 for EP application No. 15166278.0.
NTT DoCoMo, "Initial Access Procedure for Asymmetric Wider Bandwidth in LTE-Advanced", 3GPP TSG RAN WG1 Meeting#54bis, R1-083680, Sep. 29-Oct. 3, 2008, Prague, Czech Republic, XP002570946, pp. 1-5.
Panasonic, "Discussion on when UE starts aggregating carriers", 3GPP TSG RAN WG1 Meeting#55bis, R1-090261, Jan. 12-16, 2009, Ljubljana, Slovenia, XP002570945, pp. 1-2.
3GPP TS 36.331 V8.4.0 (2008-12), "3rd Generation Partnership Project; Technical Specification Group Radio Access Network; Evolved Universal Terrestrial Radio Access (E-UTRA) Radio Resource Control (RRC); Protocol specification (Release 8)", XP002570949, pp. 1-76.
Samsung, "Initial random access in asymmetric carrier aggregation", 3GPP TSG RAN WG1 Meeting#55bis, R1-090093, Jan. 12-16, 2009, Ljubljana, Slovenia, XP002570948, pp. 1-3.
Ericsson, "Carrier aggregation in LTE-Advanced", TSG-RAN WG1 #53bis, R1-082468, Jun. 30-Jul. 4, 2008, Warsaw, Poland, XP002570947, pp. 1-6.
European Search report issued on Sep. 9, 2015 for EP application No. 15166279.8.
Notice of Allowance mailed on Oct. 7, 2015 for the U.S. Appl. No. 14/645,417, filed Mar. 11, 2015, p. 1-11.
3GPP TR 36.814 V0.3.02, "3rd Generation Partnership Project; Technical Specification Group Radio Access Network; Further Advancements for E-UTRA Physical Layer Aspects (Release X)", Jan. 2009, pp. 1-31.
3GPP TS 36.300 V8.7.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description", Dec. 2008, pp. 1-144.
3GPP TS 36.321 V8.4.0, "3rd Generation Partnership Project; Technical Specification Group Radio Access Network; Evolved Universal Terrestrial Radio Access (E-UTRA) Medium Access Control (MAC) protocol specification (Release 8)", Dec. 2008, pp. 1-43.
3GPP, "3rd Generation Partnership Project; Technical Specification Group Radio Access Network; Evolved Universal Terrestrial Radio Access (E-UTRA) Radio Resource Control (RRC); Protocol specification (Release 8)", 3GPP TS 36.331 V8.4.0 (Dec. 2008), pp. 1-76, XP002570949.
Ericsson, "Carrier aggregation in LTE-Advanced", R1-082468, TSG-RAN WG1 #53bis, Warsaw, Poland, Jun. 30-Jul. 4, 2008, the whole document, XP002570947, pp. 1-6.
NTT Docomo, "Initial Access Procedure for Asymmetric Wider Bandwidth in LTE-Advanced", R1-083680, 3GPP TSG RAN WG1 Meeting #54bis, Prague, Czech Republic, Sep. 29-Oct. 3, 2008, the whole document, XP002570946, pp. 1-5.
Panasonic, "Discussion on when UE starts aggregating carriers", R1-090261, 3GPP TSG RAN WG1 Meeting #55bis, Ljubljana, Slovenia, Jan. 12-16, 2009, the whole document, XP002570945, pp. 1-2.
Samsung, "Initial random access in asymmetric carrier aggregation", R1-090093, 3GPP TSG, RAN WG1 Meeting #55bis, Ljubljana, Slovenia, Jan. 12-16, 2009, the whole document, XP002570948, pp. 1-3.
Office action mailed on Mar. 27, 2012 for the Japanese application No. 2010-057334, filing date Mar. 15, 2010, p. 1-2.
Office action mailed on Jul. 24, 2013 for the Taiwan application No. 099100682, filing date Jan. 12, 2010, p. 1-8.
3GPP TS 36.331 V8.4.0 (Dec. 2008), Release 8, p. 18-19, 37-39 and 125.
Nortel Networks, Control Channel Design for the Support of Wider Bandwidth for LTE-Advanced, TSG-RAN1 #55bis, R1-090157, Jan. 12-16, 2009, pp. 1-5, Ljubljana, Slovenia.
Qualcomm Europe, on specifying the range of DPCCH in units of TTI that are configurable, 3GPP TSG-RAN WG2 Meeting #62bis, R2-083398, Jun. 30-Jul. 4, 2008, Warsaw, Poland.
ZTE, Initial Uplink Access Procedure in LTE-Advanced, 3GPP TSG RAN WG1 Meeting #56, R1-090984, Feb. 9-13, 2009, Athens, Greece.
Catt, Physical cell ID and PSCH configuration for LTE-A, 3GPP TSG RAN WG1 #56, R1-090940, Feb. 9-13, 2009, Athens, Greece.
Office Action mailed on Dec. 15, 2015 for the Japanese Application No. 2014-262836, filing date Dec. 25, 2014, pp. 1-5.

METHOD OF ESTABLISHING MULTIPLE LINKS WITH MULTIPLE COMPONENT CARRIERS

CROSS REFERENCE TO RELATED APPLICATIONS

This application is a continuation application of U.S. application Ser. No. 12/541,982, filed Aug. 17, 2009, which is included in its entirety herein by reference. The U.S. application Ser. No. 12/541,982 claims the benefit of U.S. Provisional Application No. 61/160,713, filed on Mar. 17, 2009 and entitled "Method for Establishing Multiple Connections to Component Carriers in a Wireless Communication System and Related Communication Device" the contents of which are incorporated herein.

BACKGROUND OF THE INVENTION

1. Field of the Invention

The present invention relates to a method utilized in a wireless communication and communication device thereof, and more particularly, to a method of establishing multiple links with multiple component carriers in a wireless communication system and related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, so that the system structure becomes simple.

Toward advanced high-speed wireless communication system, such as transmitting data in a higher peak data rate, LTE-Advanced is standardized by the 3rd Generation Partnership Project (3GPP) as an enhancement of LTE system. LTE-Advanced targets faster switching between power states, improves performance at the cell edge, and includes subjects, such as bandwidth extension, coordinated multi-point transmission/reception (COMP), uplink multiple input multiple output (MIMO) extension up to 4×4, downlink MIMO extension up to 4×4, relaying, and etc.

Based on a concept of bandwidth extension, carrier aggregation is introduced to the LTE-Advanced for extension to wider bandwidth, where two or more component carriers are aggregated, for supporting wider transmission bandwidths e.g. up to 100 MHz and for spectrum aggregation. According to carrier aggregation capability, multiple component carriers are aggregated into overall wider bandwidth, wherein a user equipment (UE) can establish multiple links corresponding to the multiple component carriers for simultaneously receiving and/or transmitting on each component carrier.

Each component carrier includes a hybrid automatic repeat request (HARQ) entity and a transport block. That is, each component carrier in the LTE-Advanced works independently.

As abovementioned, the UE can utilize multiple component carriers for transmitting and/or receiving data in LTE-Advanced. However, the prior art does not clearly teach how the UE shall establish multiple links with multiple component carriers.

SUMMARY OF THE INVENTION

Therefore, the present invention provides a method of establishing multiple links with multiple component carriers in a wireless communication system and related communication device.

A method of establishing multiple links with multiple component carriers in a wireless communication system supporting carrier aggregation is provided. The method is performed by a network of the wireless communication system, and comprises establishing a first link corresponding to a first component carrier by performing a first radio resource control (RRC) procedure, to a mobile device of the wireless communication system, wherein the type of the first RRC procedure is an RRC connection establishment procedure, a handover procedure, or an inter-RAT (Radio Access Technology) handover procedure; and establishing at least a link corresponding to at least a component carrier other than the first component carrier by performing a second RRC procedure which is initiated by transmitting a first RRC message to the mobile device via the first link, to the mobile device, wherein the type of the second RRC procedure is an RRC connection reconfiguration procedure or a handover procedure, and the first link established by the first RRC procedure and the at least a link established by the second RRC procedure are configured with the same cell radio network temporary identifier (C-RNTI) for PDCCH (Physical Downlink Control Channel) receptions.

A method of establishing multiple links with multiple component carriers in a wireless communication system supporting carrier aggregation is provided. The method is performed by a network of the wireless communication system, and comprises establishing a plurality of links corresponding to a plurality of component carriers by performing only a radio resource control (RRC) procedure, to a mobile device of the wireless communication system, wherein the type of the RRC procedure is an RRC connection establishment procedure, a handover procedure, or an inter-RAT (Radio Access Technology) handover procedure, and the plurality of links established by the RRC procedure are configured with the same cell radio network temporary identifier (C-RNTI), for PDCCH (Physical Downlink Control Channel) receptions.

A method of establishing multiple links with multiple component carriers in a wireless communication system supporting carrier aggregation is provided. The method is performed by a network of the wireless communication system, and comprises establishing a first link corresponding to a first component carrier by performing a first radio resource control (RRC) procedure, to a mobile device of the wireless communication system; establishing at least a link corresponding to at least a component carrier other than the first component carrier by performing a second RRC procedure which is initiated by transmitting a first RRC message to the mobile device via the first link, to the mobile device; and performing a random access procedure initiated by receiving a random access preamble transmitted from the mobile device, for synchronization of at least one link established by the second RRC procedure to the mobile device.

A method of establishing multiple links with multiple component carriers in a wireless communication system supporting carrier aggregation is provided. The method is performed by a network of the wireless communication system, and comprises establishing a plurality of links corresponding to a plurality of component carriers by performing only a radio resource control (RRC) procedure, to a mobile device of the wireless communication system; and performing a random access procedure initiated by receiving a random access preamble transmitted from the mobile device, for synchronization of at least one of the plurality of links to the mobile device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
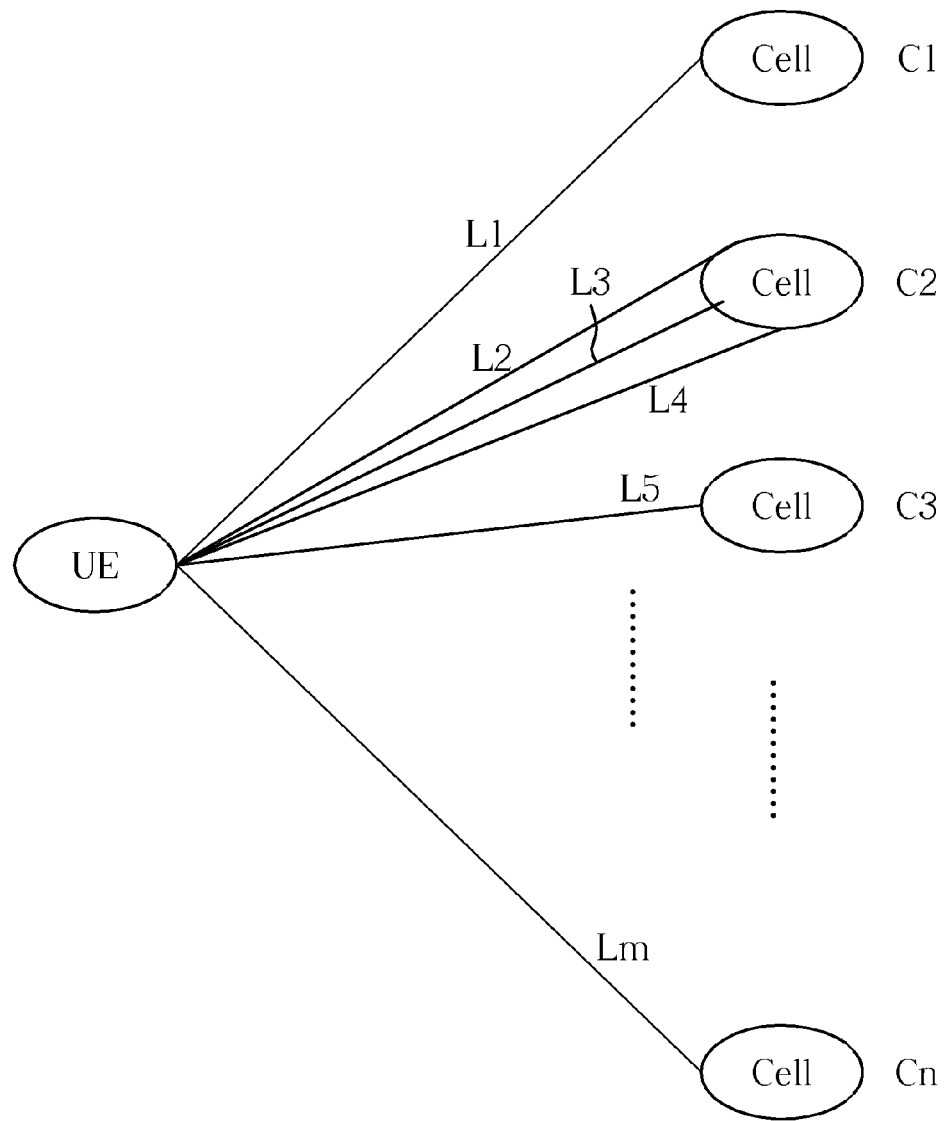
FIG. 1 is a schematic diagram of a wireless communication system with multiple component carriers.

Please refer to FIG. 1, which illustrates a schematic diagram of connections between a UE and cells C1-Cn. In FIG. 1, the cells C1-Cn and the UE are communicated through links L1-Lm each corresponding to a component carrier configured in the UE, and each support a LTE radio access technology (RAT) or an E-UTRAN (Evolved Universal Terrestrial Radio Access Network) RAT. For example, the UE is communicated with the cell C1 through the link L1, communicated with the cell C2 through the links L2-L4, and so on. Normally, the UE performs a random access procedure for uplink synchronization and initial cell access.

Figure 2:
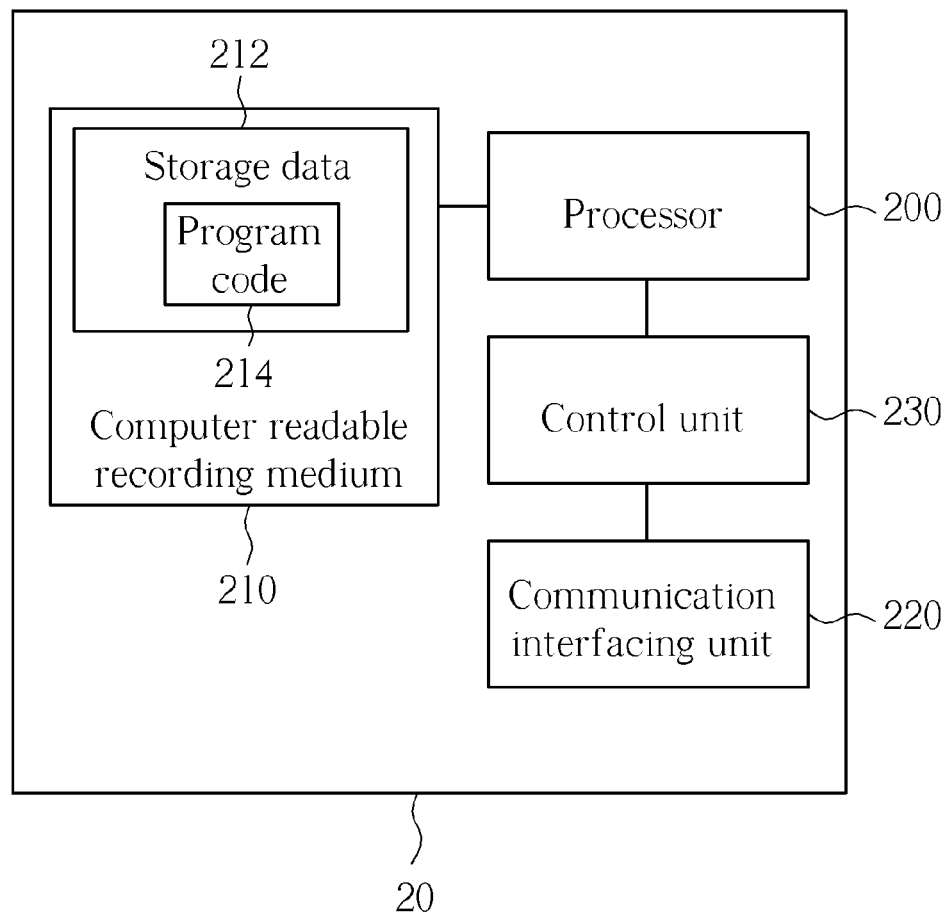
FIG. 2 is a schematic diagram of a communication device according to an embodiment of the present invention.

Please refer to FIG. 2, which illustrates a schematic diagram of a communication device 20 according to an embodiment of the present invention. The communication device 20 can be the UE shown in FIG. 1 and includes a processor 200, a computer readable recording medium 210, a communication interfacing unit 220 and a control unit 230. The computer readable recording medium 210 is any data storage device that stores storage data 212, including a program code 214, thereafter read and processed by the processor 200. Examples of the computer readable recording medium 210 include a subscriber identity module (SIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver for wirelessly communicating with the network (i.e. the cells C1-Cn).

The program code 214 includes a program code of a RRC layer which can establish links L1-Lm corresponding to component carriers. The RRC layer is used for performing RRC connection establishment, re-establishment, reconfiguration, or other RRC procedures, and is responsible for generating or releasing radio bearers (RBs) including data RBs (DRBs) and signaling RBs (SRBs). Through use of the SRBs, the RRC layer and the cells C1-Cn can exchange RRC messages for radio resource settings.

Figure 3:
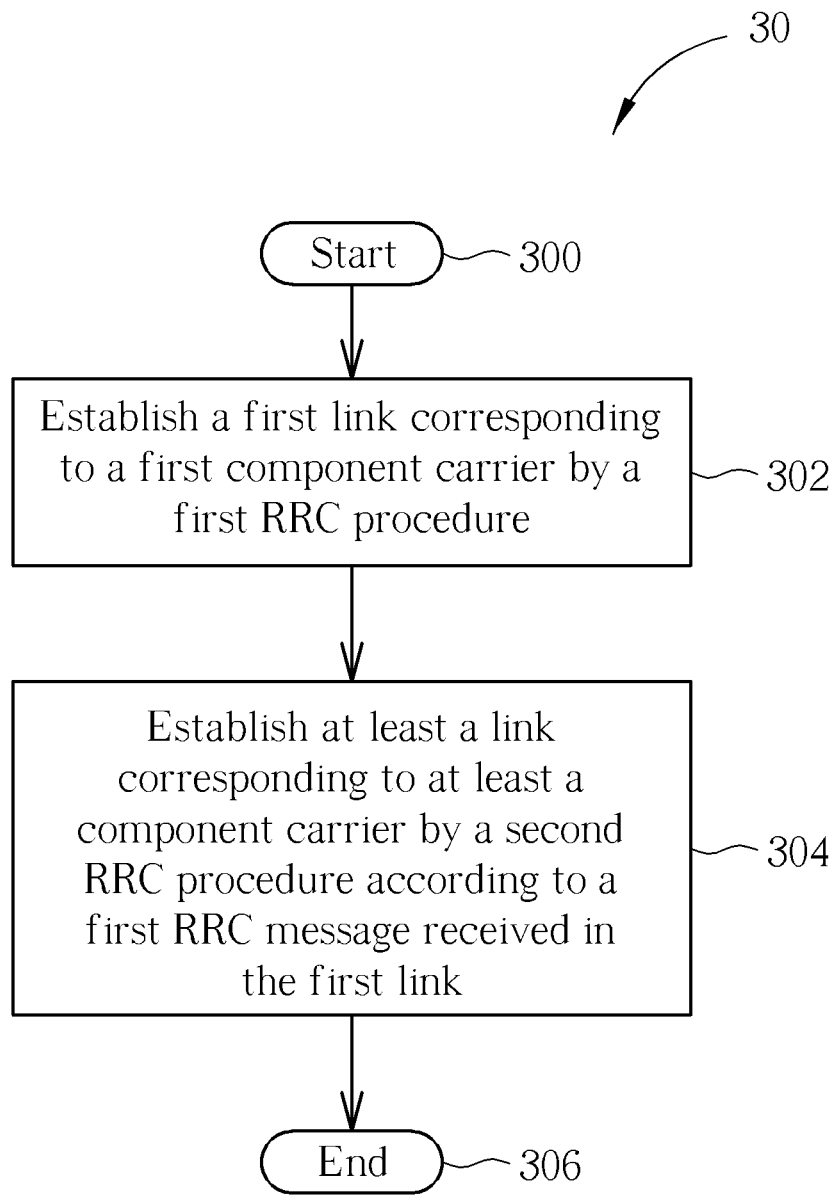
FIG. 3 is a flowchart of a process according to a first embodiment of the present invention.

Please refer to FIG. 3, which illustrates a flowchart of a process 30 according to a first embodiment of the present invention. The process 30 is utilized in the UE for establishing multiple links corresponding to multiple component carriers. The process 30 can be compiled into the program code 214 and includes the following steps:

Step 300: Start.

Step 302: Establish a first link corresponding to a first component carrier by a first RRC procedure.

Step 304: Establish at least a link corresponding to at least a component carrier by a second RRC procedure according to a first RRC message received in the first link.

Step 306: End.

According to the process 30, the UE performs RRC procedures to establish a plurality of links corresponding to a plurality of component carriers. The first link is established by the first RRC procedure for purpose(s), e.g. initial connection establishment/handover. After the first link is established successfully, a first cell which the first link is connected to configures and sends the first RRC message to the UE for further link establishment. As a result, based on the first RRC message, the UE performs the second RRC procedure for establishing at least a link corresponding to at least a component carrier. The links established by the second RRC procedure are used for other purposes, e.g. bandwidth expansion, RBs establishment, link recovery, etc. The links established by the first or second RRC procedure can be configured to connect to different cells.

The abovementioned first RRC procedure can be a RRC connection establishment procedure, a handover procedure or an inter-RAT procedure. For example, establishment of the first link by the RRC connection establishment procedure is initiated by the RRC layer for transmitting a RRC CONNECTION REQUEST message to the first cell. Then, the first cell responds a RRC CONNECTION SETUP message to the UE to complete the first link establishment, and the RRC connection establishment procedure is successfully completed. In addition to the RRC connection establishment procedure, the first link can be established by an inter-RAT to E-UTRAN procedure when the UE handovers from another RAT, such as a Global System for Mobile Communications (GSM) system, UTRAN or CDMA2000.

Moreover, the abovementioned second RRC procedure can be a RRC connection reconfiguration procedure, or a handover procedure, which is initiated by the first message received from the first cell. If the second RRC procedure is the RRC connection reconfiguration procedure, the first message is an RRC CONNECTION RECONFIGURATION message, and an RRC CONNECTION RECONFIGURATION COMPLETE message is sent by the UE to complete establishment of the link(s) established by the second RRC procedure.

Based on the process 30, the UE can firstly establish one link corresponding to a component carrier for mobile originating/terminating calls or mobile originating signaling. After the first RRC message indicating further link establishment is received in the first link, the UE establishes at least a link corresponding to at least a component carrier for bandwidth extension. Therefore, explicit establishment of multiple links with multiple component carriers is provided and thereby efficiency of data transmission can be increased.

Note that, component carriers of the first component carrier and the component carrier(s) established by the second RRC procedure may have the same component carrier frequency band when corresponding links connect to different cells.

Furthermore, the UE can perform a random access procedure for uplink synchronization and initial cell access. The UE performs at least a random access procedure for synchronization with the cells associated to the links established by the second RRC procedure in the following cases.

In the first case, the UE performs a random access procedure when the links established by the second RRC procedure are connected to cell(s) which is different from the first cell. The UE transmits a Random Access Preamble to each of the cell(s), and each cell responds a Random Access Response which includes Timing Alignment information for uplink synchronization, and a Temporary C-RNTI (Cell Radio Network Temporary Identifier) for UE identification.

In addition, the abovementioned Temporary C-RNTI is promoted to C-RNTI when the random access procedure is completed. That is, after the UE detects that the random access procedure is successful, each of the links established by the second RRC procedure or by the first RRC procedure is configured with a C-RNTI for PDCCH (Physical Downlink Control Channel) receptions, where the C-RNTIs can be the same or different between the links established in the first and second RRC procedures. Alternatively the C-RNTIs can be configured by the second RRC procedure for the links established in the second RRC procedure.

In the second case, the UE performs the random access procedure when a RRC message of the second RRC procedure indicating that synchronization is required is received. That is, the cells associated with the links established by the second RRC procedure decide whether the UE needs the random access procedure for uplink synchronization, and if the UE needs, transmits the RRC message to indicate the UE to perform the random access procedure.

In the third case, the UE performs the random access procedure when a RRC message of the second RRC procedure excluding uplink timing information is received. That is, when the UE has not or cannot derive the uplink timing information from the RRC message of the second RRC procedure, the UE performs the random access procedure for uplink synchronization.

Moreover, the random access procedure can be performed in a contention-based or non-contention-based manner depending on whether a Random Access Channel (RACH) resource used by the UE is assigned by the cell or randomly selected by the UE itself. For the contention-based random access procedure, the UE performs the random access procedure (as described in the first case) based on a physical random access resource configuration allocated in a specific RRC message of the second RRC procedure. In addition to the allocation in the RRC message, the physical random access resource configuration can be allocated in a RRC broadcast message.

For the non-contention-based random access procedure, the UE performs the random access procedure for synchronization of the links established by the second RRC procedure based on a dedicated random access resource configuration allocated in the first RRC message.

The abovementioned dedicated random access resource configuration can include dedicated preamble(s) configured by the cell(s) associated with link(s) established by the second RRC procedure. According to the dedicated preamble(s) assigned by the cells, the UE performs the random access procedure in the non-contention-based manner, which can avoid contention resolution, and thereby increases the efficiency of the random access procedure completion.

In addition to the dedicated preamble, the dedicated random access resource configuration can include a PRACH (Physical Random Access Channel) Mask Index for indicating subframes which can be transmitted a random access preamble for synchronization. For example, the PRACH Mask Index can indicate odd suframes or even subframes for the UE to send the random access preamble. Therefore, probability of collision with other random access preambles can be decreased, and thereby probability of success of the random access procedure is increased.

Figure 4:
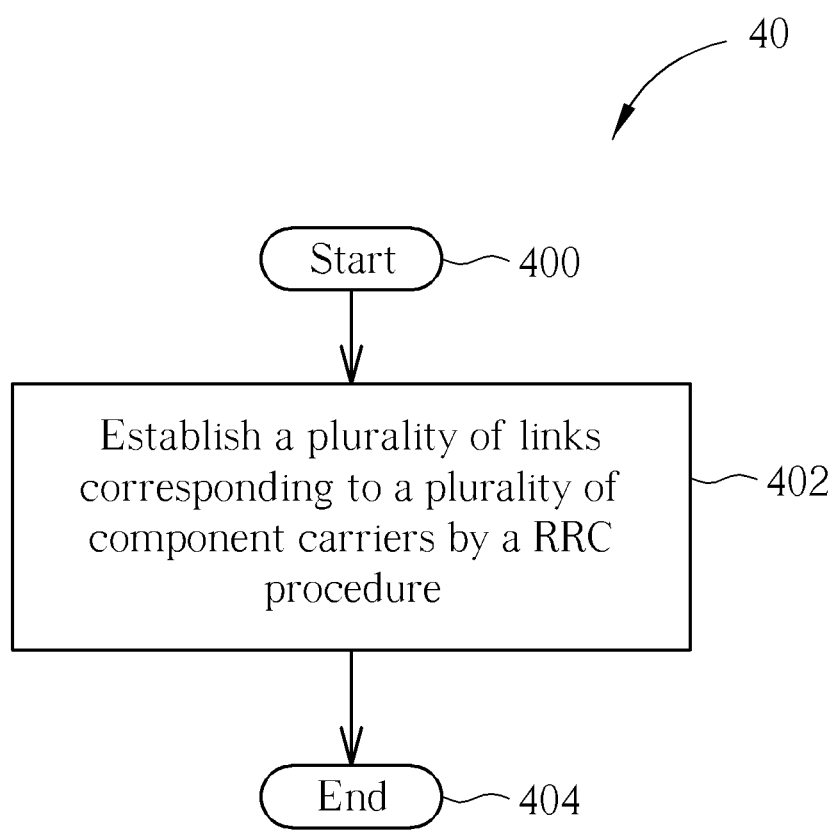
FIG. 4 is a flowchart of a process according to a second embodiment of the present invention.

Please refer to FIG. 4, which illustrates a flowchart of a process 40 according to a second embodiment of the present invention. The process 40 is utilized in the UE for establishing multiple links corresponding to multiple component carriers. The process 40 can be compiled into the program code 214 and includes the following steps:

Step 400: Start.

Step 402: Establish a plurality of links corresponding to a plurality of component carriers by a RRC procedure.

Step 404: End.

According to the process 40, the UE performs a single RRC procedure to establish a plurality of links corresponding to a plurality of component carriers for all of the possible purposes mentioned in the process 30, e.g. for both of initial connection establishment/handover and bandwidth expansion. Preferably, the RRC procedure is a RRC connection establishment procedure, a handover procedure or an inter-RAT to E-UTRAN procedure.

Please note that, some of the plurality of component carriers can have the same component carrier frequency band when corresponding links connect to different cells.

In addition, when establishing the plurality of links corresponding to the plurality of component carriers, the UE performs a random access procedure for synchronization of at least a link. As abovementioned, the UE can perform the random access when a RRC message of the RRC procedure indicating that synchronization is required is received, or when a RRC message of the RRC procedure excluding uplink timing information is received.

Moreover, the UE performs the random access procedure based on a physical random access resource configuration, or a dedicated random access resource configuration allocated in a RRC message of the RRC procedure. The detailed description regarding the random access procedure can be referred from the above description. Therefore, the related detailed description is omitted herein for simplicity.

Furthermore, after the UE detects that the random access procedure is performed successfully, each of the links established by the RRC procedure is configured with a C-RNTI (Cell Radio Network Temporary Identifier) for PDCCH (Physical Downlink Control Channel) receptions, where the C-RNTIs can be the same or different between the links established in the RRC procedures. Alternatively the C-RNTIs are configured by the RRC procedure for the links established in the RRC procedure.

Based on the process 40, the UE establishes a plurality of links corresponding to a plurality of component carriers by a single RRC procedure for connection establishment, bandwidth extension, etc.

In conclusion, the embodiments of the present invention provide explicit, appropriate ways for the UE to establish multiple links with multiple component carriers.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of establishing multiple links with multiple component carriers to a mobile device in a wireless communication system supporting carrier aggregation, the method being performed by a network of the wireless communication system, comprising:
  establishing a first link corresponding to a first component carrier to the mobile device by performing a first radio resource control (RRC) procedure, wherein the type of the first RRC procedure is an RRC connection establishment procedure, a handover procedure, or an inter-RAT (Radio Access Technology) handover procedure; and
  establishing at least a link corresponding to at least a component carrier other than the first component carrier to the mobile device by performing a second RRC procedure which is initiated by the network transmitting a first RRC message to the mobile device via the first link;
  wherein the type of the second RRC procedure is an RRC connection reconfiguration procedure or a handover procedure, and the first link established by the first RRC procedure and the at least a link established by the second RRC procedure are configured with the same cell radio network temporary identifier (C-RNTI) for PDCCH (Physical Downlink Control Channel) receptions.

2. The method of claim 1, further comprising:
  receiving a random access preamble transmitted from the mobile device, for synchronization of the at least a link established by the second RRC procedure, if the at least a link established by the second RRC procedure are connected to at least a cell which is different from a first cell which the first link is connected to.

3. The method of claim 1, further comprising:
  receiving a random access preamble transmitted from the mobile device, for synchronization of the at least a link established by the second RRC procedure, if the first RRC message transmitted to the mobile device indicates that synchronization of the at least a link established by the second RRC procedure is required.

4. The method of claim 1, further comprising:
  receiving a random access preamble transmitted from the mobile device, for synchronization of the at least a link established by the second RRC procedure, if the first RRC message transmitted to the mobile device excludes uplink timing information.

5. The method of claim 1, wherein the first component carrier that the first link established by the first RRC procedure is corresponding to and the at least one component carrier that the at least one link established by the second RRC procedure is corresponding to have the same component carrier frequency band when the corresponding links connect to different cells.

6. A method of establishing multiple links with multiple component carriers to a mobile device in a wireless communication system supporting carrier aggregation, the method being performed by a network of the wireless communication system, comprising:
  establishing a plurality of links corresponding to a plurality of component carriers to the mobile device by performing only a radio resource control (RRC) procedure, to a mobile device of the wireless communication system,
  wherein the type of the RRC procedure is an RRC connection establishment procedure, a handover procedure, or an inter-RAT (Radio Access Technology) handover procedure, and the plurality of links established by the RRC procedure are configured with the same cell radio network temporary identifier (C-RNTI), for PDCCH (Physical Downlink Control Channel) receptions.

7. The method of claim 6, further comprising:
  during the RRC procedure, the network transmitting an RRC message indicating that synchronization of at least a link is required, or excluding uplink timing information, to the mobile device; and
  receiving a random access preamble transmitted from the mobile device, for synchronization of the at least a link established by the RRC procedure.

8. The method of claim 6, wherein the plurality of component carriers have the same component carrier frequency band when the corresponding links connect to different cells.

9. A method of establishing multiple links with multiple component carriers to a mobile device in a wireless communication system supporting carrier aggregation, the method being performed by a network of the wireless communication system, comprising:
  establishing a first link corresponding to a first component carrier by performing a first radio resource control (RRC) procedure, to the mobile device of the wireless communication system;
  establishing at least a link corresponding to at least a component carrier other than the first component carrier to the mobile device by performing a second RRC procedure which is initiated by the network transmitting a first RRC message to the mobile device via the first link; and
  receiving a random access preamble transmitted from the mobile device, for synchronization of the at least one link established by the second RRC procedure to the mobile device.

10. The method of claim 9, wherein the type of the first RRC procedure is an RRC connection establishment procedure, a handover procedure, or an inter-RAT (Radio Access Technology) handover procedure, and the type of the second RRC procedure is an RRC connection reconfiguration procedure or a handover procedure.

11. The method of claim 9, wherein the at least a link established by the second RRC procedure are configured with the same cell radio network temporary identifier (C-RNTI) for PDCCH (Physical Downlink Control Channel) receptions.

12. The method of claim 9, wherein the random access procedure is performed if the at least a link established by the second RRC procedure are connected to at least a cell which is different from a first cell which the first link is connected to.

13. The method of claim 9, wherein the first RRC message transmitted to the mobile device indicates that synchronization of the at least a link established by the second RRC procedure is required, or excludes uplink timing information.

14. The method of claim 9, wherein first component carrier that the first link established by the first RRC procedure is corresponding to and the at least one component carrier that the at least one link established by the second RRC procedure is corresponding to have the same component carrier frequency band when the corresponding links connect to different cells.

15. A method of establishing multiple links with multiple component carriers to a mobile device in a wireless communication system supporting carrier aggregation, the method being performed by a network of the wireless communication system, comprising:

establishing a plurality of links corresponding to a plurality of component carriers by performing only a radio resource control (RRC) procedure, to a mobile device of the wireless communication system; and receiving a random access preamble transmitted from the mobile device, for synchronization of the at least one of the plurality of links to the mobile device;

wherein the type of the RRC procedure is an RRC connection establishment procedure, a handover procedure, or an inter-RAT (Radio Access Technology) handover procedure.

16. The method of claim 15, wherein the plurality of links established by the RRC procedure are configured with the same cell radio network temporary identifier (C-RNTI) for PDCCH (Physical Downlink Control Channel) receptions.

17. The method of claim 15, further comprising:
during the RRC procedure, transmitting an RRC message indicating that synchronization of at least a link established by the RRC procedure is required, or excluding uplink timing information, to the mobile device.

18. The method of claim 15, wherein the plurality of component carriers have the same component carrier frequency band when the corresponding links connect to different cells.

* * * * *